United States Patent [19]

Vyse

[11] Patent Number: 4,733,890
[45] Date of Patent: Mar. 29, 1988

[54] FORMED FLUID COUPLING APPARATUS

[75] Inventor: Gerrard N. Vyse, Bedford, Tex.

[73] Assignee: Stratoflex, Inc., Fort Worth, Tex.

[21] Appl. No.: 896,070

[22] Filed: Aug. 13, 1986

Related U.S. Application Data

[63] Continuation of Ser. No. 629,059, Jul. 9, 1984, abandoned.

[51] Int. Cl.[4] .................... F16L 13/00; F16L 33/20
[52] U.S. Cl. .................... 285/174; 285/158; 285/256; 285/321
[58] Field of Search ............ 285/321, 256, 174, 157

[56] References Cited

U.S. PATENT DOCUMENTS

| | | | |
|---|---|---|---|
| 2,441,344 | 5/1948 | Bosworth . | |
| 2,735,505 | 2/1956 | Kleiman | 285/321 X |
| 2,935,343 | 5/1960 | Ellis | 285/95 |
| 3,027,179 | 3/1962 | Wiltse | 285/321 |
| 3,381,983 | 5/1968 | Hanes | 285/321 |
| 3,434,745 | 3/1969 | Jackman | 285/111 |
| 3,479,068 | 11/1969 | Brittain | 285/321 |
| 3,540,760 | 11/1970 | Miller et al. | 285/321 |
| 3,549,180 | 12/1970 | MacWilliam | 285/256 |
| 3,584,902 | 6/1971 | Vyse | 285/305 |
| 3,637,239 | 1/1972 | Daniel | 285/321 X |
| 3,718,350 | 2/1973 | Klein | 285/321 X |
| 3,841,671 | 10/1974 | Walker | 285/321 X |
| 3,853,339 | 12/1974 | Wilson | 285/157 |
| 3,871,691 | 3/1975 | Takagi et al. | 285/321 |
| 3,887,222 | 6/1975 | Hammond | 285/307 |
| 3,924,883 | 12/1975 | Frank | 285/256 |
| 3,944,263 | 3/1976 | Arnold | 285/321 X |
| 3,973,791 | 8/1976 | Porta et al. | 285/174 X |
| 4,063,760 | 12/1977 | Moreiras | 285/242 |
| 4,097,074 | 6/1978 | Nagao et al. | 285/231 |
| 4,111,464 | 9/1978 | Asano et al. | 285/321 X |
| 4,133,564 | 1/1979 | Sarson et al. | 285/321 |
| 4,193,616 | 3/1980 | Sarson et al. | 285/39 |
| 4,226,445 | 10/1980 | Kramer | 285/39 |
| 4,240,654 | 12/1980 | Gladieux | 285/321 X |
| 4,278,276 | 7/1981 | Ekman | 285/321 X |
| 4,319,773 | 3/1982 | Lawson | 285/137.2 |
| 4,351,450 | 9/1982 | Summerfield . | |
| 4,401,326 | 8/1983 | Blair | 285/321 X |
| 4,426,105 | 1/1984 | Plaquin et al. | 285/32 X |
| 4,565,392 | 1/1986 | Vyse | 285/321 |

FOREIGN PATENT DOCUMENTS

| | | | |
|---|---|---|---|
| 335236 | 2/1977 | Austria . | |
| 343426 | 5/1978 | Austria . | |
| 003142 | 7/1979 | European Pat. Off. | 285/256 |
| 2758668 | 12/1977 | Fed. Rep. of Germany . | |
| 2942120 | 10/1979 | Fed. Rep. of Germany . | |
| 405461 | 8/1943 | Italy | 285/321 |
| 1248396 | 9/1971 | United Kingdom | 285/174 |

Primary Examiner—Thomas F. Callaghan
Attorney, Agent, or Firm—Marshall, O'Toole, Gerstein, Murray & Bicknell

[57] ABSTRACT

This disclosure relates to apparatus for making fluid flow connections. The apparatus comprises a tubular metal member having first and second ends. The first end is mechanically formed to the shape of one part of a two part quick-connect coupling, the one part being integrally formed on the first end of the member. The second end is mechanically formed to the shape of another fitting part which is also integral with the member. The portion of the member between the two ends is shaped to follow a desired path in order to interconnect other components.

The one part of the quick-connect coupling preferably forms a tubular receptacle having an annular internal groove, a snap ring in the groove, and a relatively viscous fluid at least partially filling the groove around the ring.

The disclosure also relates to a method of making and assembling apparatus as described.

4 Claims, 4 Drawing Figures

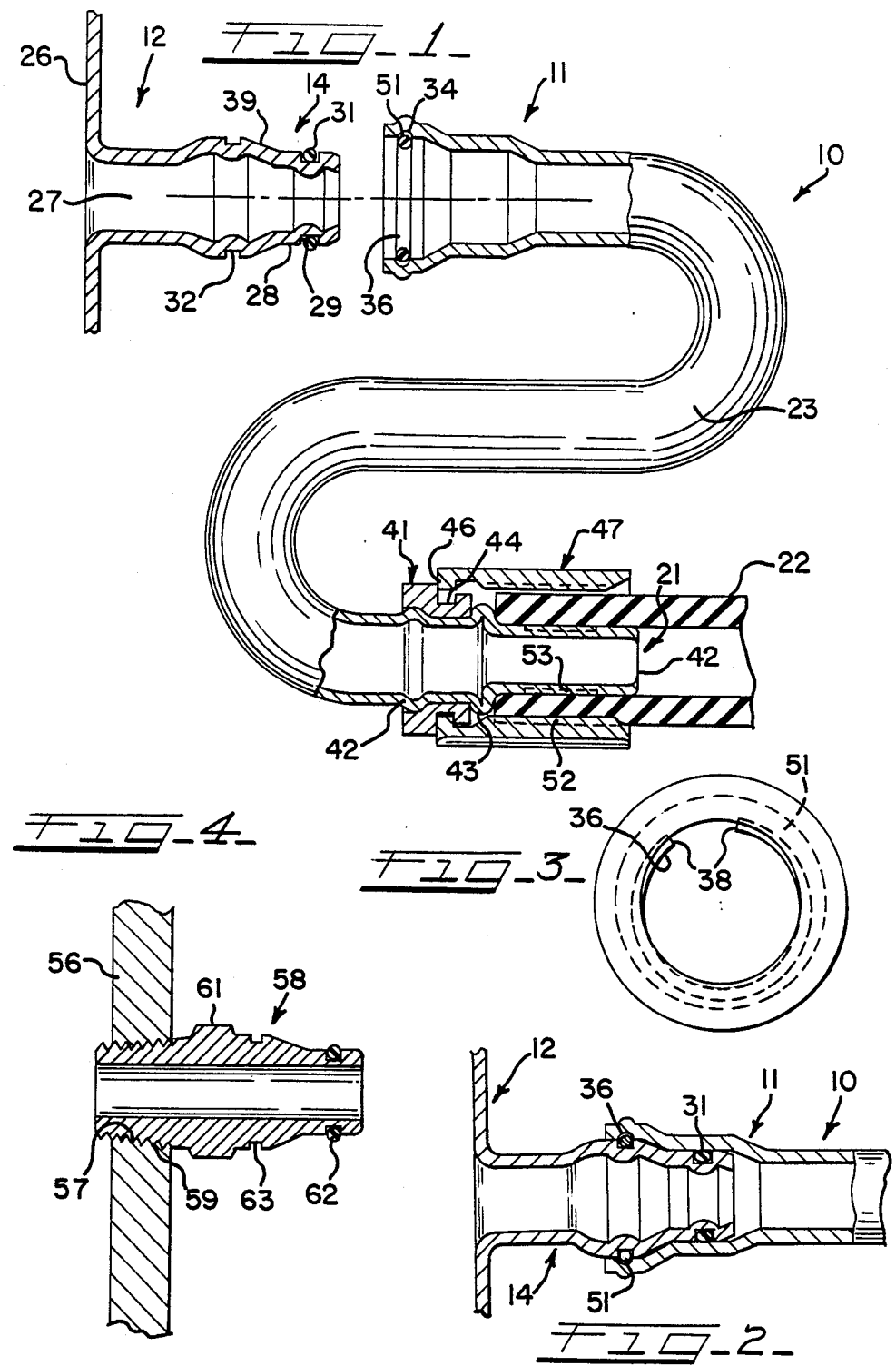

FORMED FLUID COUPLING APPARATUS

This is a continuation of application Ser. No. 629,059, filed July 9, 1984, and now abandoned.

BACKGROUND OF THE INVENTION

The use of hose and/or metal tubes has been well known for many years, for making fluid flow connections in machines such as truck and automobile engines. Some systems include flexible hose made of synthetic rubber or plastic and fittings or couplings at the ends of the hose for making connections to other machine parts. In other systems, metal tubes have been used in place of the hose, and tubes have the advantage that they can be passed close to very hot machine parts. In truck and automobile engines, the flow mediums in such systems have been engine oil, transmission oil and fuel, for example.

Both types of systems, as used in the prior art on internal combustion engines, have disadvantages. Systems including flexible hose are relatively expensive because of the number of machined fittings or couplings that have been required at the ends of the hose. Further, hose should not be passed close to very hot engine parts. Systems including metal tubes have also been relatively expensive because they have included metal couplings that have been brazed to the tubes, which is an expensive operation.

Quick connect fittings or couplings have also been used in such systems. Couplings of this type are shown, for example, in U.S. Pat. Nos. 3,479,068, 3,540,760 and 3,584,902. Such arrangements as used in the prior art have had the disadvantages of being excessively expensive and/or not being easily and quickly assembled, particularly in locations where the connection must be made on a moving assembly line and the worker cannot easily view the parts during assembly. In other words, where "blind connections" must be performed, it is important that such connections be readily made.

It is a general object of this invention to provide an improved construction which avoids the foregoing disadvantages.

SUMMARY OF THE INVENTION

Apparatus in accordance with the present invention comprises a tubular metal member having first and second ends. The first end is mechanically formed to the shape of one part of a two part quick-connect coupling, the one part being integrally formed on the first end of the member. The second end is mechanically formed to the shape of another fitting part which is also integral with the member. The portion of the member between the two ends is shaped to follow a desired path in order to interconnect other components.

The one part of the quick-connect coupling preferably forms a tubular receptacle having an annular internal groove, a snap ring in the groove, and a relatively viscous fluid at least partially filling the groove around the ring.

The invention also comprises the method of making and assembling apparatus as described.

BRIEF DESCRIPTION OF THE DRAWINGS

The invention will be better understood from the following detailed description taken in conjunction with the figures of the accompanying drawing, wherein:

FIG. 1 view partially in section of apparatus including the present invention;

FIG. 2 is a fragmentary sectional view showing parts of the apparatus in FIG. 1 in fully assembled positions;

FIG. 3 is an enlarged end view of part of the apparatus; and

FIG. 4 shows an alternate construction of part of the apparatus.

DETAILED DESCRIPTION OF THE DRAWINGS

With specific reference to FIG. 1, apparatus in accordance with the present invention comprises a generally tubular member indicated by the numeral 10 that has a substantially round cross section. One end of the member 10 is shaped in the form of a part 11 of a quick-connect coupling or fitting which is adapted to be attached to a component indicated generally by the numeral 12. The quick-connect coupling has two parts, the part 11 which is formed integrally with the member 10 and another part 14 which is attached to the component 12. The member 10 further includes a second end 21 which is mechanically formed as will be described hereinafter to be attached to another component. In the present specific example, the other component comprises a length of flexible hose 22 made of rubber, synthetic rubber or plastic, for example.

Between the two ends, the member 10 includes a center portion 23 which is shaped or bent in such a manner as to interconnect the two components 12 and 22.

The component 12 may comprise, for example, the oil cooler, oil filter, or transmission oil cooler of an internal combustion engine. The component 12 in this example includes a sheet metal housing 26 having a tubular flow passage 27 formed therein. The flow passage 27 in the present example is formed by the insert part 14 of the coupling, the part 14 having a stepped outer surface 28. The right-hand end of the surface 28 is reduced and an annular seal groove 29 is formed adjacent the right-hand end thereof, an O-ring seal 31 being mounted in the groove 29. Spaced rearwardly, or to the left, of the groove 29 is an inner annular snap ring groove 32 which is formed in a radially enlarged section of the part 14.

The coupling part 11 formed on the end of the member 10 is shaped to form a receptacle for the insert part 14. The inner periphery of the part 11 has an outer annular groove 34 formed therein and an annular snap ring 36 (FIGS. 1 and 3) is mounted in the groove 34. When the insert part 14 is moved into the receptacle part 11, as shown in FIG. 2, the two grooves 32 and 34 are substantially in radial alignment and the snap ring 36 is located in the two grooves 32 and 34, thereby preventing disassembly of the two parts 11 and 14. The O-ring 31 engages the internal surface of the part 11 adjacent the forward end of the part 14 and thus forms a fluid tight seal between the two parts 11 and 14.

As shown in FIG. 3, the snap ring 36 is split, thereby forming a gap having ends 38, and the ring 36 is preferably made of a spring metal. The ring 36 is sized such that its internal diameter, when in the unflexed state shown in FIG. 3, is larger than the diameter of the forward end portion of the part 14 but substantially equal to the diameter of the bottom of the groove 32. When the part 14 is inserted into the opening of the part 11, the ring 36 engages a sloped or ramped surface 39 of the part 14, causing the ring 36 to expand to the diameter of the enlarged part, until the ring 36 snaps into the inner groove 32 as shown in FIG. 2.

The other end 21 of the member 10 is mechanically formed to be connected to the hose 22. For this purpose, the diameter of the end 21 is reduced to approximately the inner diameter of the hose 22. A ring or collar 41 is positioned around the end 21 at a location which is spaced from the endmost surface 42, the internal diameter of the collar 41 approximating the outer diameter of the member 10. The end portion 21 is mechanically formed or "bumped" to produce beads 42 and 43 on opposite sides of the ring 41 in order to secure the ring against longitudinal movement relative to the member 10. A groove 44 is formed in the outer periphery of the ring 41 which receives a flange 46 of a sleeve 47, the sleeve 47 being radially spaced from and encompassing the end portion of the member 10. Prior to final assembly, the hose 22 is positioned over the end 21 and up against the bead 43 and within the sleeve 47, and then the sleeve 47 is deformed radially inwardly as by a crimping or swaging operation. This latter operation both forces the flange 46 into the groove 44 in order to secure the ring 41 and the sleeve 47 together, and it radially compresses the end of the hose 22 between the sleeve 47 and the end 21 of the member 10, thereby firmly securing and sealing the member 10 to the hose 22.

The center portion 23 of the member 10 is bent in whatever form is necessary to enable the ends 11 and 21 to interconnect with the components 12 and 22.

The end 11 and the end 21 of the member 10 are both shaped by mechanically forming or shaping them such as to enable them to be connected to the components 12 and 22 without the need for further fittings or brazing operations. By the term "mechanically forming" or "mechanically shaping", it is meant that the parts are deformed to the required configuration with no machining operations or with a minimum of such machining. The part 11 may be mechanically formed by first expanding the end and producing the stepped inner opening and the groove 34 as by a rolling operation. Thereafter, the ring 36 is radially compressed slightly to enable it to be inserted into the groove 36, as shown in FIG. 3.

As described in more detail in U.S. Pat. No. 4,565,392 dated Jan. 21, 1986, entitled Quick Connect Coupling, the groove 34 is at least partially filled with a relatively viscous fluid 51, such as grease, which holds the ring 36 in a substantially centered position in the groove 34, as shown in FIG. 3, prior to final assembly of the two parts 11 and 14. This arrangement has the advantage that it prevents the ring 36 from moving to one side of the groove 34 prior to final assembly and thereby obstructing the movement of the part 14 into the opening of the part 11.

As previously mentioned, the other end 21 is also mechanically formed and does not include brazed or threaded connections with the center portion 23 of the member 10. The endmost portion is reduced in diameter slightly to enable it to be inserted into the hose 22 and the beads 42 and 43 are formed by a mechanical bumping operation. The ring 41 and the sleeve 47 may also be shaped by a mechanical rolling operation. External teeth or ribs 52 may be formed as by a rolling operation on the outer surface of the end 21 and similar ribs or teeth 53 may be formed on the internal surface of the sleeve 47 in order to enhance the gripping and sealing functions of these parts.

FIG. 4 illustrates an alternative coupling part that may be provided in place of the part 14. Where the component is not made of sheet metal as in the case of the component 12 but instead includes a relatively thick housing wall 56 as shown in FIG. 4, the wall 56 may be provided with an internally threaded hole 57 that threadedly receives a coupling part 58. The part 58 has external teeth 59 formed thereon which engage the teeth 57, and hexagonal sides 61 may be provided to facilitate screwing the part 58 into the hole 57. A O-ring groove 62 and a snap ring groove 63 may also be machined on the outer periphery of the part 58. The exterior contour of the part 58 is essentially the same as the contour of the part 14 so that it may mate with the end part 11.

It will be apparent from the foregoing that apparatus in accordance with this invention has important advantages. The member 10 is attachable to two components and nevertheless it may be inexpensively constructed by mechanical shaping operations. The end part 11 is attachable to the part 14 by simply pressing the two parts together. The viscous fluid 51 in the groove 34 assures a problem free connection even when a "blind connection" is being made, because the fluid holds the ring 36 generally centered in the groove 34.

In prior art systems wherein two coupling parts are screwed together to make a connection, the twisting of the parts as they are assembled sometimes leaves residual stresses in the parts which can lead to premature failure due to fatigue. This problem is avoided when using apparatus according to this invention.

It should be obvious that the end 21 may be shaped similarly to the part 11 and be connected to a different component than the hose 22. While the coupling part 11 may have the shape of the insert part 14, it is preferred that it be the receptacle part as shown.

What is claimed is:

1. Apparatus adapted to extend between and be connected to a first component and to a hose, said first component including an insert part of a quick-connect coupling and having an annular insert groove in the outer periphery thereof, said apparatus comprising an elongated thin walled metal tube formed by a substantially constant thickness circular wall, said tube having first and second ends, first coupling means on said first end, said first coupling means comprising a one-piece receptacle part of said coupling, said receptacle part being mechanically formed on and integral with said tube and having an annular receptacle groove formed on the interior surface of said wall, said first coupling means further comprising an expandable split metal snap ring carried by said receptacle groove, said receptacle groove having a larger diameter than the unexpanded diameter of said ring whereby said ring may be expanded outwardly in said receptacle groove, said ring being engageable within said insert and receptacle grooves and forming a permanently locked connection of said receptacle part with said insert part, an O-ring seal engaging said interior surface of said wall inwardly of said snap ring, second coupling means mechanically formed on and integral with said second end, said second coupling means being adapted to be rigidly secured to said hose, and an elongated portion of said tube between said first and second ends being shaped to extend between the first component and the hose.

2. Apparatus according to claim 1, and further including a relatively viscous fluid at least partially filling said groove around said ring.

3. Apparatus according to claim 2, wherein said fluid comprises grease.

4. Apparatus according to claim 1, and further comprising said hose, said second coupling means being secured to said hose and to said second end, said second end being mechanically formed to interlock with said hose and with said second coupling means.

* * * * *